(12) United States Patent
Waffler et al.

(10) Patent No.: US 6,953,053 B2
(45) Date of Patent: Oct. 11, 2005

(54) PRESSURE RELIEF VALVE ASSEMBLY

(75) Inventors: Burdell Eugene Waffler, North Ridgeville, OH (US); Timothy Scott LaCrosse, Avon, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 183 days.

(21) Appl. No.: 10/449,563

(22) Filed: May 30, 2003

(65) Prior Publication Data
US 2004/0107999 A1 Jun. 10, 2004

Related U.S. Application Data
(60) Provisional application No. 60/432,389, filed on Dec. 10, 2002.

(51) Int. Cl.$^7$ ............................................... F16K 15/02
(52) U.S. Cl. ...................... 137/538; 137/251; 137/337; 137/357; 137/368
(58) Field of Search ................................ 137/524, 538, 137/540, 543.19; 251/337, 357, 368

(56) References Cited

U.S. PATENT DOCUMENTS

| | | | |
|---|---|---|---|
| 860,820 A | * | 7/1907 | Norton ......................... 137/538 |
| 1,073,719 A | * | 9/1913 | Timmer ........................ 137/538 |
| 1,702,550 A | * | 2/1929 | Stevenson .................... 137/538 |
| 1,841,337 A | * | 1/1932 | Roessler ...................... 137/538 |
| 1,944,518 A | | 1/1934 | Lovekin et al. |
| 2,011,333 A | | 8/1935 | Clifton |
| 2,287,840 A | * | 6/1942 | Stratton ...................... 137/538 |
| 2,321,679 A | * | 6/1943 | Houston ...................... 137/524 |
| 2,859,031 A | * | 11/1958 | Hansen et al. .............. 137/524 |
| 2,908,288 A | * | 10/1959 | Carr et al. ................... 137/524 |
| 3,017,897 A | * | 1/1962 | Seguenot .................... 137/538 |
| 3,709,241 A | | 1/1973 | McJones |
| 3,770,009 A | * | 11/1973 | Miller .................... 137/543.19 |
| 4,064,906 A | * | 12/1977 | Berg ........................... 137/538 |
| 4,450,861 A | * | 5/1984 | Bouteille .................... 137/524 |
| 4,657,043 A | | 4/1987 | Ampferer et al. |
| 4,742,997 A | * | 5/1988 | Wallis ......................... 137/538 |
| 6,068,022 A | | 5/2000 | Schultz et al. |

* cited by examiner

Primary Examiner—John Rivell
(74) Attorney, Agent, or Firm—Joseph J. Pophal

(57) ABSTRACT

A relief valve assembly including a valve member, having inlet and outlet bores, for sliding movement within a valve body bore portion, having a cylindrical sleeve portion, journalled via a cylindrical sleeve bearing for substantially the entire axial extent thereof, with a valve member head portion having a plurality of equally spaced apertures, connecting the inlet bore and a sleeve portion central cavity with the outlet bore. An annular resilient seal, having a flat-faced sealing surface is retained in the valve member head portion for sealingly engaging a valve body valve seat portion. A compression member, for biasing the valve member to a closed position, is operatively interposed between an adjustment member piston portion and a valve member sleeve cavity, the adjustment member having an adjustment stem for external adjustment of the compression member. A radial end thrust bearing, is interposed between the compression member and the adjustment member.

45 Claims, 2 Drawing Sheets

PRESSURE RELIEF VALVE ASSEMBLY

CROSS-REFERENCE TO RELATED CASES

The present application claims the benefit of the filing date of U.S. Provisional Application Ser. No. 60/432,389 filed Dec. 10, 2002, the disclosure of which is incorporated herein by reference.

FIELD OF THE INVENTION

The present invention pertains to a pressure relief valve assembly that is adapted to regulate system pressure, within a very tight tolerance pressure override characteristic window, while maintaining stability and low hysteresis.

BACKGROUND OF THE INVENTION

The present invention finds applicability and utility, among other uses, as a helium pressure relief valve for semi-conductor manufacturing systems, the latter operating at a temperatures nearing 0 degrees Kelvin.

In particular, a specific pressure relief valve assembly of this invention is utilized to control the system pressure within gas compressors, and is capable of modulating gaseous helium flow over a range of 0–100 scfm with a 20 psi maximum pressure override characteristic. No pressure set point is allowed and 0.50 scfm flow rate is considered crack/reset flow. In addition, the valve must have an adjustable pressure setting and must pass a wrench "tap" test, with this test basically introducing a vibration or instability into the valve assembly, when installed and while modulating flow at 85 scfm.

A known prior art design pressure relief valve assembly is unable to meet the noted pressure override characteristic or stability requirement without the use of an additional, external, separate device, taking the form of a 2 inch diameter by 12 inch long stainless steel surge tank. It is the function of this separate surge tank to dampen the valve assembly operation in order to obtain stable operation thereof. Furthermore, in this prior art construction, the pressure is fixed, thus permitting no such adjustments. In addition, the same prior art construction also utilizes conical elastomeric seals which do not permit precision breakaway at the set point, thus overshooting the pressure setting.

SUMMARY OF THE PRESENT INVENTION

The present invention addresses prior art problems in that it utilizes one or more of a plurality of features to achieve relief valve operation. These features include the use of a stability bearing to provide low pressure override to allow constant performance regardless of valve set point, and a low hysteresis design to permit accurate pressure control, again regardless of set point. The use of a flat face seal permits precision breakaway at set point and a precision pressure adjustment allows for a single valve assembly to be used over entire compressor ranges.

Specifically, the present invention includes a valve body having a multi-step cylindrical axial through bore, with an inlet bore portion, an annular valve seat portion downstream of the inlet bore portion, a valve member bore portion downstream of the valve seat portion, an adjustment member bore portion downstream of the valve member bore portion, and an outlet bore portion projecting from the adjustment bore portion.

Another feature includes a valve member, located within the valve member bore portion, with a cylindrical head portion. The cylindrical head portion has a central aperture and a diameter less than that of the valve member bore portion, and an annular end face at one end. The other end of the head portion merges into a cylindrical sleeve portion having a central cavity. The central cavity is open to the adjustable member bore portion and has an annular shoulder surface within the cavity, and adjoining the head portion. The valve member head portion further includes a plurality of apertures, extending through the head portion, into the sleeve portion central cavity.

A further feature includes a cylindrical sleeve bearing, positioned within the valve member bore portion, in close-fit sliding contact with the outer peripheral surface of the sleeve portion. The sleeve bearing journals the axial movement of the valve member relative to the valve member bore portion.

Yet another feature provides an annular, resilient elastomeric seal, including a flat annular sealing surface, sealingly retained in the annular end face of the valve member head portion. The flat annular sealing surface is adapted to sealingly engage with the valve body annular valve seat portion.

Still a further feature includes an adjustment member, sealingly and slidingly retained within the valve body adjustment member bore portion. The adjustment member includes an inner piston portion and an adjustment stem, for external adjustment of the longitudinal location of the inner piston portion, relative to the adjustment member bore portion.

As yet another feature includes a compression member operatively interposed between the adjustment member piston portion and the shoulder surface within the valve member sleeve cavity. The compression member is adapted to bias the valve member into a closed position; with the valve member being adapted for axial movement, to an open position, in which pressurized fluid flows, from the inlet bore portion, between the seal member and the valve seat portion into the valve member bore portion and subsequently, via the plurality of apertures, through the valve member head portion into the valve member sleeve portion cavity and therefrom, via the adjustable member bore portion, into and out of the outlet bore portion.

Further features include that the pressurized fluid is a gaseous medium, that the gaseous medium is helium, that the plurality of apertures are tapered and equally circumferentially spaced and that plurality of angled apertures preferably comprises at least three, and more preferably, four apertures.

Other features include that the axial extent of said cylindrical sleeve bearing is substantially equal to the axial extent of the valve member sleeve portion, that the sleeve bearing includes a low friction bearing surface to ensure low friction reciprocal movement of the valve member, that the close-fit sliding contact does not exceed a diametral clearance of about 0.003 inches between the peripheral surface of the cylindrical sleeve portion and the inside diameter of the bearing, as well as that the axial movement of the valve member does not exceed about 0.010 inches.

Additional features further include an annular shoulder portion located at the intersection of the valve member bore and the adjustment member bore portions, with one end of the sleeve bearing being located at the shoulder portion, and the bearing being press-fit within the valve member bore portion.

In other features of the invention, the annular end face of the valve member head portion is multi-stepped, the elastomeric annular seal is square cut, multi-stepped, and sealingly retained in the first noted multi-stepped annular end face. Furthermore, the annular end face of the valve member bore portion is stepped and the elastomeric seal is retained in the valve member head portion, via an externally threaded seal retaining screw, in operative engagement with the central aperture of the valve member cylindrical head portion.

Yet further features include a cap member, in operative engagement with one end of the valve body, for closing an outer axial end of the valve body. The cap member includes an internally threaded central axial aperture in operative engagement with at least an axial length of the adjustment stem of the adjustment member. An additional feature includes an adjustment stop nut, in operative engagement with the adjustment stem and an axial outer end surface of the cap member, for fixedly securing the adjustment member against axial movement.

Still further features include that the outlet bore portion is disposed in a sidewall of the valve body at about mid-axial length of the valve body, and that the valve body outlet portion is at an angle relative to the valve body axial bore and preferably substantially perpendicular to the valve body axial bore.

Added features include that the adjustable member piston portion utilizes at least one circumferential groove, with a further elastomeric seal member being located within the one groove(s), and that the cross section of the further elastomeric seal member is curvelinear, and preferably circular.

Further added features include that the compression member takes the form of a compression spring and that the adjustment member piston portion includes a cylindrical recess in an inner axial end surface thereof, this recess serving to locate and center one end of the compression spring.

Another feature includes the use of a radial end thrust bearing interposed between an inner end face of the cylindrical recess and the adjoining one end of the compression spring.

Yet additional features of the present invention include that at least the valve body and the cap member are comprised of a light metal alloy, that this alloy is an aluminum alloy, that the valve body and the cap member are subjected to an anodizing treatment and that the anodizing treatment for the valve body differs from that of the cap member.

DETAILED DESCRIPTION OF THE PREFERRED EMBODIMENT

Figure 1:
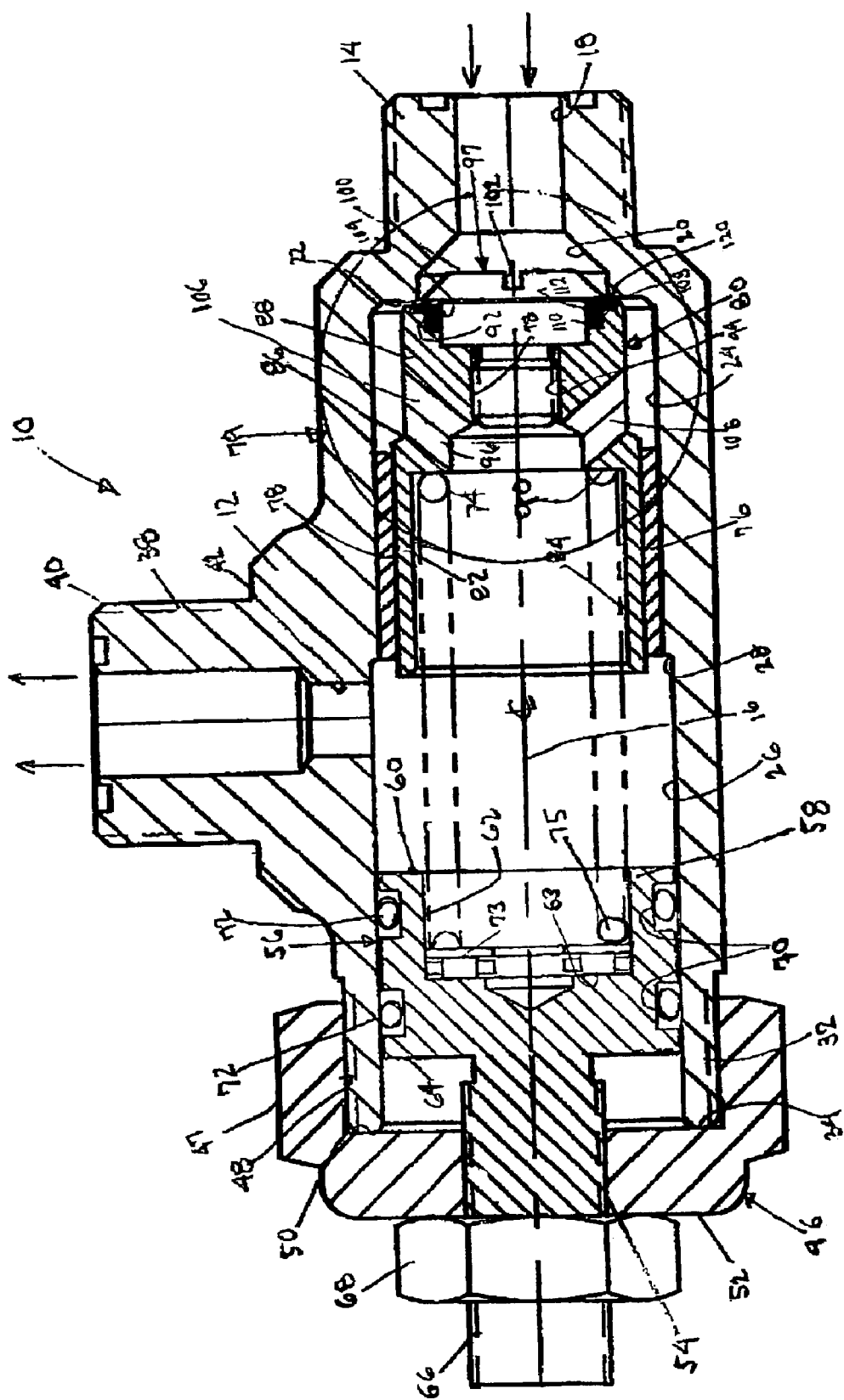
FIG. 1 is a vertical longitudinal cross sectional view of the relief valve assembly of this invention.

Turning now to the drawings, and particularly to FIG. 1, there is illustrated a vertical longitudinal cross section of the relief valve assembly 10 of this invention.

Relief valve assembly 10 includes a generally cylindrical valve body 12 having a longitudinal, externally threaded inlet portion 14 with a concentric inlet bore portion 18, the inner end of which leads into an increased diameter multiple stepped bore portion 20 that includes an annular internal shoulder surface 22. The radial outer end of shoulder surface 22 merges into a longitudinally extending poppet or valve member bore portion 24 which in turn merges into a slightly larger diameter adjustment portion 26 at a shoulder portion 28. Adjustment bore portion 26 terminates at its outer end in an annular outer end face 34 of externally threaded valve end portion 32. Together, valve bore portions 18, 20, 24 and 26 form the concentric and longitudinally extending through bore 16 of valve body 12.

Valve body 12 is also provided with a radially extending, externally threaded outlet portion 38 having a stepped concentric outlet bore portion 40, whose smaller diameter radial inner portion 42 smoothly terminates, perpendicularly, at adjustment bore portion 26 in the vicinity of shoulder portion 28 of cylindrical through bore 16.

Valve end portion 32 is sealingly closed via a cap member 46 preferably having a hexagonally configured outer peripheral surface 47 and a peripheral internally threaded annular portion 48 adapted for operative sealing engagement with externally threaded valve end portion 32 when cap member inner surface 50 abuts valve end portion annular end face 34. The axial outer end of cap member threaded portion 48 merges into a circular disk portion 52 having an internally threaded central axial aperture 54.

Sealingly and slidably received within adjustment bore portion 26 is a pressure adjustment member 56 comprised of a cylindrical piston portion 58 of a diameter very close to that of bore portion 26. To permit proper sealing, relative to bore portion 26, a seal member 72, such as for example an O-ring, is provided in each of a multiple of axially spaced external grooves 70 in piston portion 58. The use of such axially spaced seal members 72 adds to the stability of movement of piston portion 58. The inner end face 60 of piston portion 58 is provided with a cylindrical recess 62, while extending from the outer end face 64 thereof is an externally threaded adjustment stem 66 that is in operative engagement with end cap threaded aperture 54 and extends axially beyond cap disk portion 52 for a distance sufficient to permit the threading thereupon of an adjustment stop nut 68. Nut 68 is adapted to be tightened against the outer end face of cap member disk portion 52. An inwardly directed recess of any desired shape (not shown), extending inwardly from the outer end face of adjustment stem 66, is adapted for the insertion of a tool for rotating or turning adjustment member 56, relative to cap member 46, thus changing or adjusting the axial position or location of piston portion 56 within bore portion 26.

Located with in bore portion 24 is a cylindrical sleeve bearing 76 having a low friction inner contact surface 78, with bearing 76, for example taking the form a steel-backed low friction DU bearing that is commercially available from Garlock Bearing Inc. Bearing 76 is preferably press-fitted into bore portion 24, with the inner end surface of bearing 76 being coplanar with bore shoulder portion 28. The axial extent of bearing 76 is greater than one half of the axial extent of bore portion 24. Reciprocally slidingly received within bearing 76 is the cylindrical sleeve portion 82 of a poppet or valve member 80, whose diametral clearance, relative to the inside diameter of bearing 76, is no greater than about 0.003 inches. In addition, and as is well shown in FIG. 1, the axial extent of bearing 76 is substantially equal to the axial extent of poppet cylindrical sleeve portion 82, with the former providing for the continuous or total stability of sleeve portion 82 during its axial movement which, as will be described in more detail hereinafter, is very short and generally does not exceed 0.010 inches.

Figure 2:
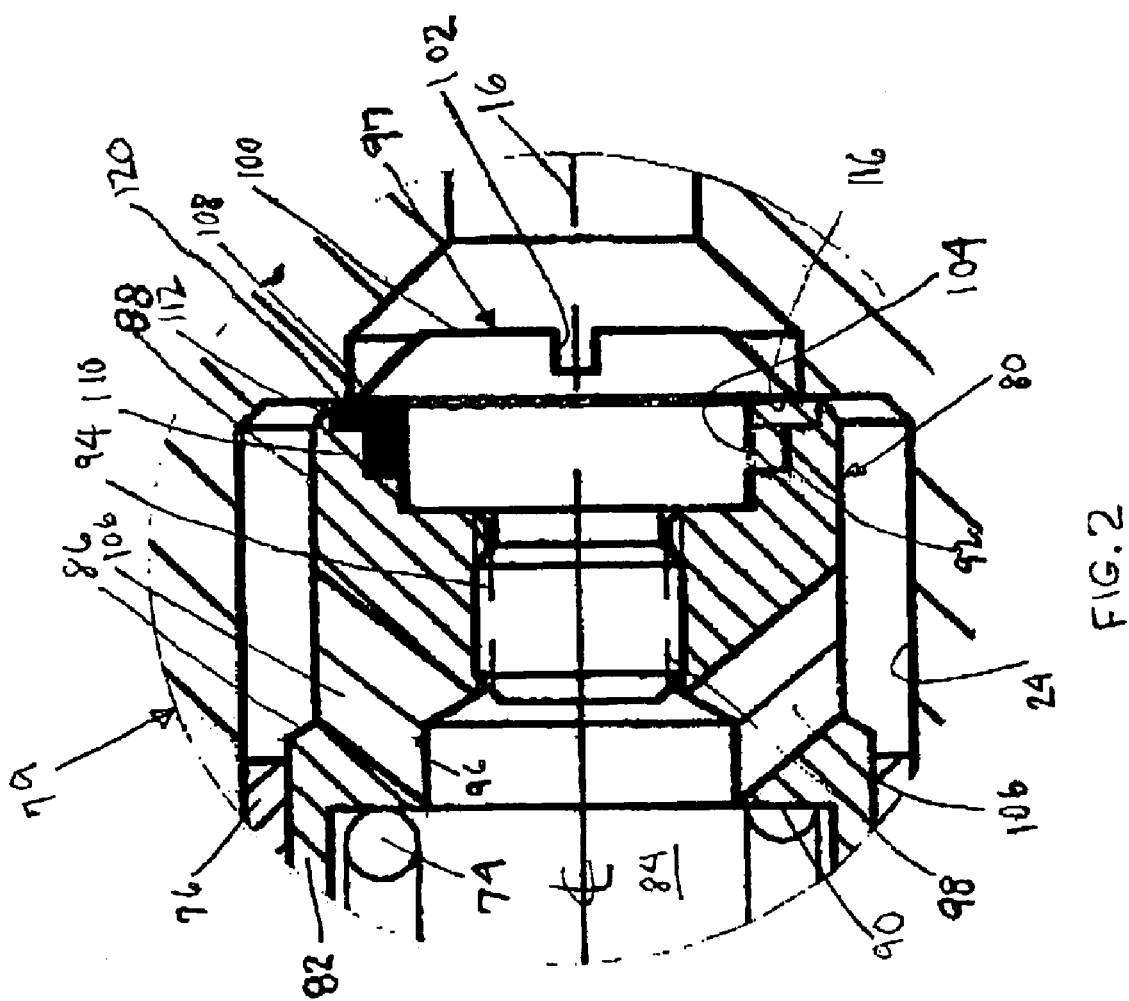
FIG. 2 is a slightly modified enlargement of the circled area in FIG. 1.

As best seen in FIG. 2, which is an enlarged version of the circled area 79 of FIG. 1, sleeve portion 82, is joined to a poppet cylinder head portion 88 via an annular step portion 86, the latter having an inner annular shoulder surface 90, which also bounds the axial extent of a sleeve portion cavity 84. The axial outer end of head portion 88 is provided with a multiple annular step portion 92, best shown below the center line in FIG. 2, where the seal member 108 (to be described hereinafter) has been removed for ease of illustration and understanding. Multiple step bore portion 92 has inward steps of decreasing diameter that finally merge into an internally threaded central bore portion 94, concentric with valve body through bore 16 and merging into bore portion 96 of annular step portion 86. Bore portion 96 merges into poppet sleeve cavity 84, which opens into adjustment bore portion 26, that in turn, exits into radial stepped outlet bore portion 40.

Operatively received within threaded central bore portion 94 is the externally threaded axial portion 98 of a seal retaining screw 97, also having a tapered or frustoconical head portion 100 provided with a tool-receiving recess 102 as well as a reduced diameter portion 104, the inner end of which merges into threaded portion 98. Portion 104 serves as the carrier or receiver of a multi-stepped, resilient, elastomeric square cut seal 108. The cylindrical inside diameter of seal 108 is sealingly received on portion 104, with a smaller diameter one of an inner step portion 110 of seal member 108 being adapted to being matingly received in one step of poppet head portion 92, while a larger diameter axial outer annular step portion 112 is adapted to be sealingly pressed against an annular outer step or surface 114 of poppet head portion 92 by the annular underside 116 of retaining screw head portion 100. The diameter of annular outer step portion 112 is greater than that of head portion 100, and the annular flat portion 120 that extends radially outwardly of the largest diameter of head portion 100 is adapted to be biased into a sealing relationship with annular shoulder 22 of valve body bore portion 20. Seal retaining screw threaded axial portion 98 is preferably additionally rotationally secured, relative to its mating threaded central bore portion 94, via a coating of an anaerobic sealant, such as, for example, with one of the products produced by the Loctite Corporation, in order to forestall any loosening thereof due to the reciprocating cycles of poppet/valve member 80.

The axial extent of poppet bore portion 24 is limited, on one end, by valve body annular shoulder 22, in conjunction with annular flat seal portion 120, and, on the other end, by poppet stepped portion 86 in conjunction with the outer annular end face of support bearing 76. The radial extent of poppet bore portion 24 is limited, on the outside, by valve body 12 and, on the inside, by poppet 80. However, there is communication between poppet bore portion 24 and poppet sleeve cavity 84 via a plurality of preferably evenly circumferentially spaced, apertures 106, angled with respect to the central longitudinal axis of the valve member head portion, and extending from poppet head portion 88, through head portion 88 and step portion 86 into bore portion 96 of step portion 86.

As previously noted, seal member flat annular portion 120 is adapted to be biased into sealing relationship with valve body shoulder portion 22. The noted biasing is achieved via the use of an adjustable biasing compression spring 74 situated in valve body bore 16 and located, on one end, within and in abutment with adjustment member recess 62 and, on the other end, within poppet inner shoulder surface 90. The biasing force of biasing member or compression spring 74 can, of course, be varied by adjusting the axial position of adjustment member 56 in the manner already previously described. In order to reduce the amount of operator torque, required to turn adjustment stem 66, and to permit precise adjustments, a radial end thrust bearing, such as a needle bearing 73, is preferably located between the inner end surface 63 of recess 62 and the adjoining end 75 of compression spring 74.

In the at-rest position of relief valve assembly 10, the axial force of compression spring 74, acting on poppet 80 biases flat annular surface portion 120 of elastomeric seal member 108 into sealing relationship with valve body annular shoulder 22, at a value determined by the annular area or surface of flat seal portion 120 and the preload value of compression spring 74.

In terms of materials, valve body 12 and cap member 46 are preferably produced of a metallic material, such as light metal alloy of aluminum, for example, with all surfaces of such an aluminum alloy thereof preferably being anodized. Valve body 12 is preferably black anodized while cap member 46 is hard coat anodized in order to minimize any galling or seizing problems during assembly/disassembly operations, etc. The remainder of the components, except for bearing surface contact area 78 and seal member 108, are comprised of ferrous alloys.

In operation, a gaseous medium under pressure, such as helium, is directed, via suitable piping (not shown) into valve inlet bore portion 18 and enters multiple stepped valve bore portion 20 and acts against the combination of the surface area of retaining screw head portion 100 and seal member annular area 120. Upon the buildup of sufficient area unit pressure, poppet 80 is slightly axially inwardly displaced, thereby permitting the gaseous medium to pass between seal portion 120 and annular bore portion shoulder 22 into poppet bore portion 24. The gaseous medium is then directed through the plurality of angled apertures 106 into adjustment bore portion 26, from which it exits via radial outlet bore portion 40 for continued processing, et al. In order to ensure stability and smooth movement of poppet 80, preferably three, and more preferably four, equally peripherally-spaced inwardly tapering or angled apertures 106 are utilized, although the number and spacing of the apertures could vary depending upon the particular application.

As previously noted, the axial/longitudinal movement or stroke of poppet or valve member 80 is very short, typically in the range of 0.002 to 0.005 inches and generally does not exceed 0.010 inches, at a flow rate of about 100 cfsm. As mentioned, substantially the entire length of poppet cylinder sleeve portion 82 is fully axially and peripherally supported by bearing low friction surface 78 at all times, which also contributes to the stability and smooth movement of poppet 80. The use of stability bearing 76 results in low pressure override and low hysteresis operating characteristics, i.e., low pressure override results in constant valve performance regardless of the pressure set point and is more energy efficient than known prior art valves, while the low hysteresis values, resulting from this design and construction, permit accurate pressure control regardless of the pressure set point.

Furthermore, the use of flat, annular, seal member face portion 120, acting against valve body bore shoulder 22, permits precision breakaway of poppet 80 at all pressure set points, thus eliminating the undesirable considerable breakaway force characteristic of the generally-utilized O-ring or conical seals that causes poppet stroke overshoot and excessive fluid pressure deviations in known prior art valve constructions.

The valve pressure adjustment feature, via the use of adjustment member 56, allows the use of but one valve over the entire span of compressor ranges, whereas in some prior art constructions the valve pressure is fixed at but one value.

While there is shown and described a present preferred embodiment of this invention, it is to be distinctly understood that the invention is not limited thereto, but may be otherwise variously embodied and practiced within the scope of the following claims.

What is claimed is:

1. A pressure relief valve assembly comprising:
    a valve body including a multi-step cylindrical axial through bore, having an inlet bore portion, an annular valve seat portion downstream of said inlet bore portion, a valve member bore portion downstream of said valve seat portion, an adjustment member bore portion downstream of said valve member bore portion, and an outlet bore portion projecting from said adjustment bore portion;
    a valve member, located within said valve member bore portion, including a cylindrical head portion, the cylindrical head portion having a central aperture and an outer diameter less than that of said valve member bore portion, and an annular end face at one end of the cylindrical head portion, with the other end thereof merging into a cylindrical sleeve portion having a central cavity, open to said adjustable member bore portion, the adjustable member bore portion having an annular shoulder surface, within said cavity, adjoining said head portion, said valve member head portion further including a plurality of apertures, extending through said head portion, into said sleeve portion central cavity;
    a cylindrical sleeve bearing, positioned within said valve member bore portion, in close-fit sliding contact with the outer peripheral surface of said sleeve portion, for journaling the axial movement of said valve member relative to said valve member bore portion;
    an annular resilient seal, including a flat annular sealing surface, sealingly retained in the annular end face of said valve member head portion, said flat annular sealing surface being adapted to sealingly engage with said valve body annular valve seat portion;
    an adjustment member, sealingly and slidingly retained within said valve body adjustment member bore portion, including an inner piston portion and an adjustment stem, for external adjustment of the longitudinal location of said inner piston portion, relative to said adjustment member bore portion; and
    a compression member, operatively interposed between said adjustment member piston portion and the shoulder surface within said valve member sleeve cavity, said compression member biasing said valve member toward a closed position;
    said valve member being adapted for axial movement, to an open position, in which pressurized fluid can flow, from said inlet bore portion, between said seal member and said valve seat portion into said valve member bore portion and subsequently, via said plurality of apertures, through said valve member head portion into said valve member sleeve portion cavity and therefrom, via said adjustable member bore portion, into and out of said outlet bore portion.

2. The pressure relief valve assembly of claim 1, wherein said pressurized fluid is a gaseous medium.

3. The pressure relief valve assembly of claim 2, wherein said gaseous medium is helium.

4. The pressure relief valve assembly of claim 1, wherein said plurality of apertures are angled with respect to a central axis of the valve member head portion and equally circumferentially spaced.

5. The pressure relief valve assembly of claim 4, wherein said plurality of apertures comprises at least three apertures.

6. The pressure relief valve assembly of claim 4, wherein said plurality of apertures comprises four apertures.

7. The pressure relief valve assembly of claim 1, wherein the axial extent of said cylindrical sleeve bearing is substantially equal to the axial extent of said valve member sleeve portion.

8. The pressure relief valve assembly of claim 7, wherein said sleeve bearing includes a low friction bearing surface to ensure low friction reciprocal movement of said valve member.

9. The pressure relief valve assembly of claim 7, wherein said close-fit sliding contact does not exceed a diametral clearance of about 0.003 inches between the peripheral surface of said cylindrical sleeve portion and the inside diameter of said bearing.

10. The pressure relief valve assembly of claim 7, wherein the axial movement of said valve member does not exceed about 0.010 inches.

11. The pressure relief valve assembly of claim 7, further including an annular shoulder portion at the intersection of said valve member bore and said adjustment member bore portions, with one end of said sleeve bearing being located at said shoulder portion.

12. The pressure relief valve assembly of claim 7, wherein said sleeve bearing is press-fit within said valve member bore portion.

13. The pressure relief valve assembly of claim 1, wherein the annular end face of said valve member head portion is multi-stepped.

14. The pressure relief valve assembly of claim 13, wherein said resilient annular seal is square cut, multi-stepped, and sealingly retained in the multi-stepped annular end face of said valve member head portion.

15. The pressure relief valve assembly of claim 1, wherein the annular end face of said valve member bore portion is stepped.

16. The pressure relief valve assembly of claim 1, wherein said resilient seal is retained in said valve member head portion, via an externally threaded seal retaining screw, in operative engagement with the central aperture of said valve member cylindrical head portion.

17. The pressure relief valve assembly of claim 1, further including a cap member, in operative engagement with one end of said valve body, for closing an outer axial end of said valve body.

18. The pressure relief valve assembly of claim 17, wherein said cap member includes an internally threaded central axial aperture in operative engagement with at least an axial length of the adjustment stem of said adjustment member.

19. The pressure relief valve assembly of claim 18, further including an adjustment stop nut, in operative engagement with said adjustment portion and an axial outer end surface of said cap member, for fixedly securing said adjustment member against axial movement.

20. The pressure relief valve assembly of claim 1, wherein said outlet bore portion is disposed in a sidewall of said valve body at about mid-axial length of said valve body.

21. The pressure relief valve assembly of claim 20, wherein said valve body outlet portion is at an angle relative to said valve body axial bore.

22. The pressure relief valve assembly of claim 21, wherein said outlet bore portion is substantially perpendicular to said valve body axial bore.

23. The pressure relief valve assembly of claim 1, wherein said adjustable member piston portion includes at least one circumferential groove, with a further resilient seal member being located within each of said at least one groove.

24. The pressure relief valve assembly of claim 23, wherein the cross section of said further resilient seal member is curvelinear.

25. The pressure relief valve assembly of claim 24, wherein said curvelinear shape is circular.

26. The pressure relief valve assembly of claim 1, wherein said compression member takes the form of a compression spring.

27. The pressure relief valve assembly of claim 26, wherein said adjustment member piston portion includes a cylindrical recess in an inner axial end surface thereof, said recess serving to locate and center one end of said compression spring.

28. The pressure relief valve assembly of claim 27 further including a radial end thrust bearing interposed between an inner end face of said cylindrical recess and the adjoining one end of said compression spring.

29. The pressure relief valve assembly of claim 1, wherein at least said valve body and said cap member are comprised of a light metal alloy.

30. The pressure relief valve assembly of claim 29, wherein said alloy is an aluminum alloy.

31. The pressure relief valve assembly of claim 30, wherein said valve body and said cap member are comprised of an anodized aluminum alloy.

32. The pressure relief valve assembly of claim 31 wherein said anodized alloy for said valve body differs from that of said cap member.

33. A pressure relief valve assembly comprising:
a valve body including a multi-step cylindrical axial through-bore, having an inlet bore portion, an annular valve seat portion downstream of said inlet bore portion, a valve member bore portion downstream of said valve seat portion, an adjustment member bore portion downstream of said valve member bore portion, and an outlet bore portion projecting from said adjustment bore portion at an angle;
a valve member, located within said valve member bore portion, including a cylindrical head portion, the cylindrical head portion having a central aperture and an outer diameter less than that of said valve member bore portion, and a stepped annular end face at one end of the cylindrical head portion, with the other end thereof merging into a larger diameter cylindrical sleeve portion having a central cavity, open to said adjustable member bore portion, the adjustable bore portion having an annular shoulder surface, within said cavity, adjoining said head portion, said valve member head portion further including a plurality of apertures, angled with respect to a central axis of the valve member head portion, the apertures extending through said head portion, for connecting said valve member bore portion and said sleeve portion central cavity;
the outer peripheral surface of said valve member sleeve portion being journalled, for substantially its entire axial extent, within a cylindrical sleeve bearing, fixedly positioned within said valve member bore portion, having a low friction bearing surface, in close-fit sliding contact with said outer peripheral surface for low friction reciprocal axial movement of said valve member relative to said valve member bore portion;
a square cut multi-step annular resilient seal, having a flat sealing surface, sealingly retained in the stepped annular end face of said valve member head portion, said flat sealing surface being adapted to sealingly engage with said valve body annular valve seat portion;
an adjustment member, sealingly and slidably retained within said valve body adjustment member bore portion, including an inner piston portion and an adjustment stem, extending partially axially outwardly from said adjustment member bore portion, for external adjustment of the longitudinal location of said piston portion, relative to said adjustment member bore portion; and
a compression member, operatively interposed between said adjustment member piston portion and the shoulder surface within said valve member sleeve cavity, said compression member biasing said valve member toward a closed position via the sealing engagement of said annular seal flat annular sealing surface with said valve bore annular valve seat portion; said valve member being adapted for axial movement, to an open position, in which pressurized fluid can flow, from said inlet bore portion, between said seal member and said valve seat portion into said valve member bore portion and subsequently, via said plurality of angled apertures, through said valve member head portion into said valve member sleeve portion cavity and therefrom, via said adjustable member bore portion, into and out of said outlet bore portion.

34. The pressure relief valve assembly of claim 33, wherein said pressurized fluid is helium.

35. The pressure relief valve assembly of claim 33, wherein the close fit sliding contact does not exceed a diametral clearance of about 0.003 inches.

36. The pressure relief valve assembly of claim 33, wherein the axial one-way movement of said valve member does not exceed a distance of about 0.010 inches.

37. The pressure relief valve assembly of claim 33, wherein said elastomeric resilient seal is fixedly retained in said valve member head portion, via an externally threaded seal retaining screw, in operative engagement with the central aperture of said valve member head portion.

38. The pressure relief valve assembly of claim 33, further including a cap member, in operative engagement with one end of said valve body, for closing one end of said adjustment member bore portion.

39. The pressure relief valve assembly of claim 38, wherein said cap member includes an internally threaded central axial aperture in operative engagement with the adjustment portion of said adjustment member.

40. The pressure relief valve assembly of claim 39, further including an adjustment stop nut in operative engagement with said adjustment stem and an axial outer end surface of said cap member, for fixedly securing said adjustment portion against axial movement after an axial movement of said adjustment member.

41. The pressure relief valve assembly of claim 33, wherein said adjustment member piston portion includes at least one circumferential groove, with a further resilient seal being located within each of said at least one groove.

42. The pressure relief valve assembly of claim 41, wherein the cross section of said further resilient seal is substantially circular.

43. The pressure relief valve assembly of claim 33, wherein said adjustment member piston portion includes a cylindrical recess in an inner end surface thereof, said recess serving to locate and center one end of said compression spring.

44. The pressure relief valve assembly of claim 43, further including a radial thrust needle bearing interposed between an inner end surface of said cylindrical recess and the adjoining one end of said compression spring.

45. The pressure relief valve assembly of claim 33, wherein said resilient seal is fixedly retained in said valve member head portion, via an externally threaded seal retaining screw, in operative engagement with the central aperture of said valve member cylindrical head portion, with said operative engagement being augmented by the addition of an anaerobic sealant.

* * * * *